Aug. 23, 1938.  F. C. ASHBY  2,128,069
STEERING WHEEL
Filed Aug. 28, 1936  3 Sheets-Sheet 1

INVENTOR
Francis Cyril Ashby
BY Joseph J. Juhasz
ATTORNEY

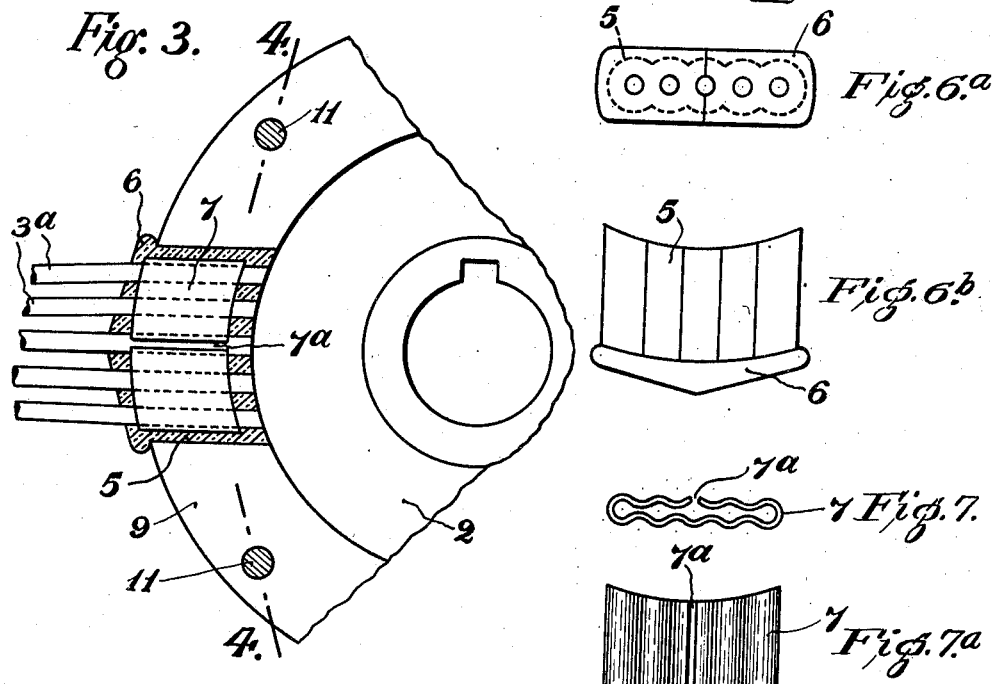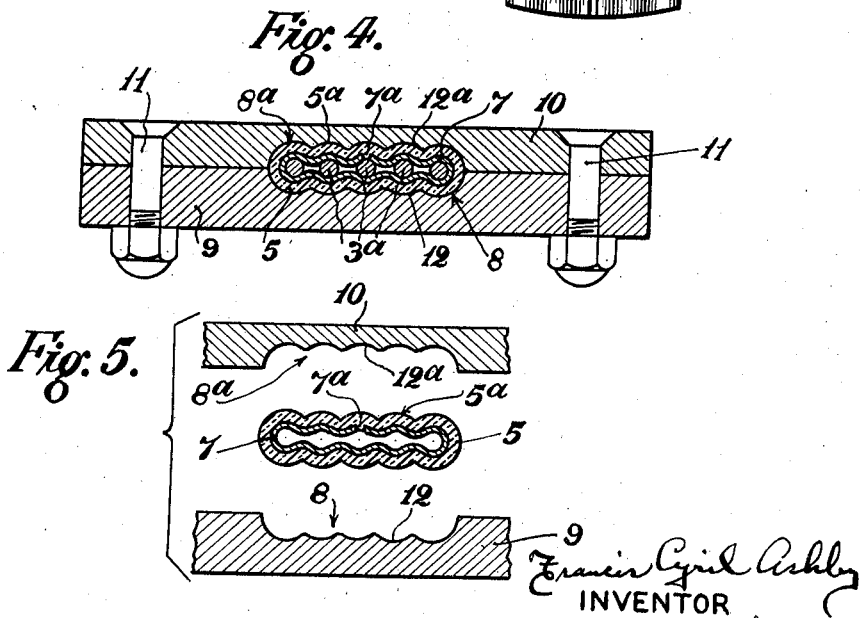

Aug. 23, 1938.　　　　F. C. ASHBY　　　　2,128,069
STEERING WHEEL
Filed Aug. 28, 1936　　　3 Sheets-Sheet 3
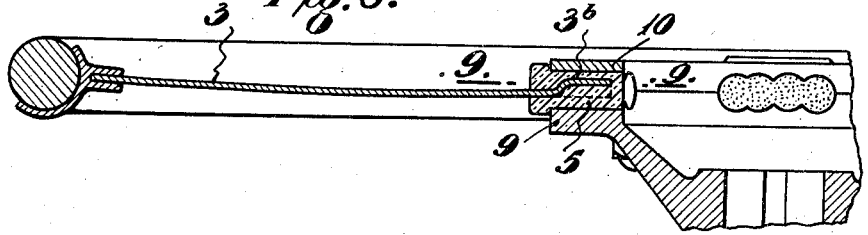
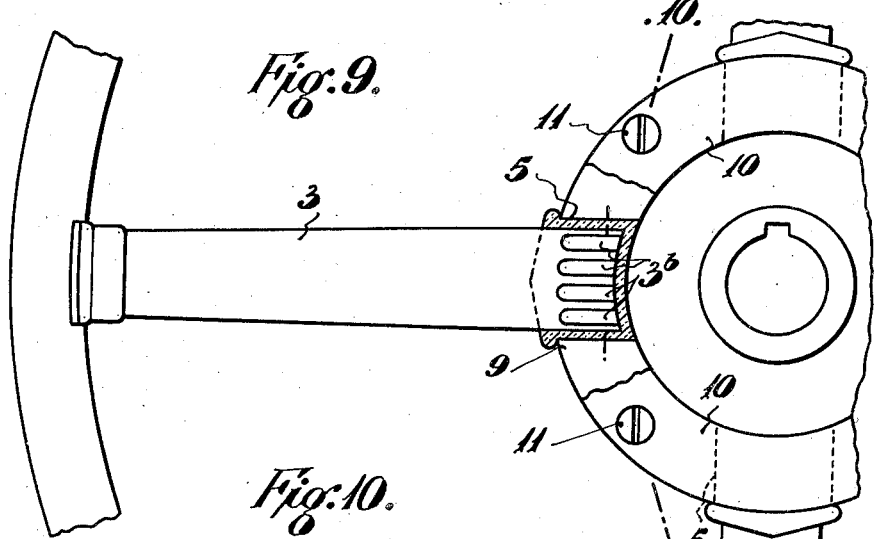
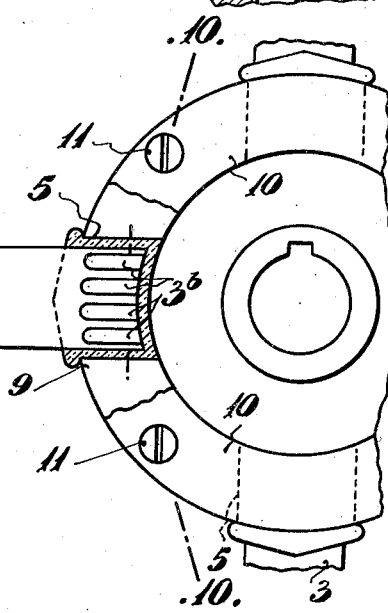
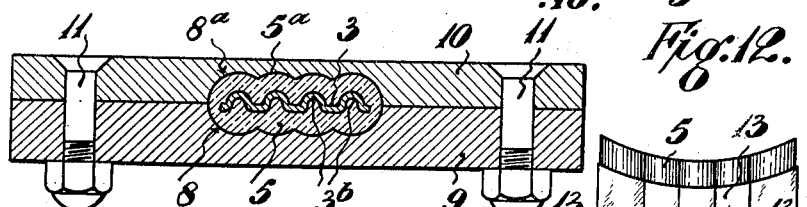
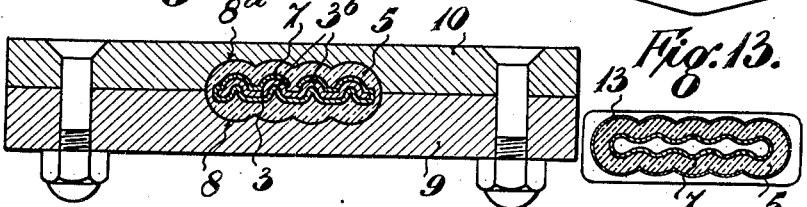
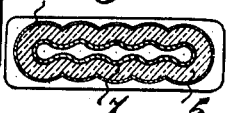
INVENTOR
Francis Cyril Ashby
BY Joseph Duhasz
ATTORNEY Patented Aug. 23, 1938

2,128,069

UNITED STATES PATENT OFFICE 2,128,069

STEERING WHEEL

Francis Cyril Ashby, Birmingham, England, assignor to Frank Ashby and Sons Limited, Birmingham, England, a company of Great Britain Application August 28, 1936, Serial No. 98,297
In Great Britain September 14, 1935

14 Claims. (Cl. 74—552)

This invention relates to hand steering wheels for controlling the steering mechanism of motor vehicles and the like, of the kind in which the arms or spokes are resiliently connected to a central boss by means of which the wheel is mounted upon a steering column or pillar.

The principal object of the present invention is to provide an improved steering wheel having, between the arms or spokes and the boss, a simple and practical shock-absorbing connection which, while imparting an effective degree of flexibility to the wheel rim in relation to the boss, will not detrimentally affect the steering efficiency of the wheel, and which effectively prevents undue radial movement of the arms or spokes in relation to the boss.

An important advantage of the invention resides in its application to flexible steering wheels having spring arms or spokes. With the usual construction of such flexible wheels the arms or spokes are rigidly connected to the boss, but the amount of flexibility in a vertical direction is mainly controlled by the free length of the arms or spokes which is available for flexing. At the present time it is very common for large steering-wheel hubs to be provided upon motor vehicles in order to accommodate central controls, such as lamp switches, battery-charging switches, direction-indicator controls and the like; and as it is not feasible to increase the diameter of the rim, it is obvious that the length of the spokes that is available for flexibly absorbing shocks and vibration is, in many cases, comparatively small, and such a flexible wheel is not very efficient for the purpose it is intended. The present invention is designed to afford, in a practical and efficient manner, a resilient mounting of the spokes upon the boss, so that the flexibility of the wheel as a whole is greatly increased, enabling vibrations and shocks to be effectively absorbed.

Further objects are to enable an effective shock-absorbing device to be applied to steering wheels designed for various makes of cars and having bosses of various sizes; to eliminate the possibility of displacement of the shock-absorbing rubber parts; to control the amount of vertical movement of the wheel rim in relation to the boss for any given diameter of the wheel or boss; and to admit of soft rubber being employed without detriment to the steering qualities of the wheel and to the security of the spokes.

It has been found that if it is attempted to mount the inner ends of the spokes resiliently upon the hub by enclosing them in soft rubber which is clamped between two parts of the hub, without effective provision for restraining displacement, the rubber will spread laterally and not only will it be impossible to obtain a secure grip upon the spokes, but also the resiliency of the rubber above and below the spokes is seriously impaired; while if a harder rubber is employed, although the security of the spokes may be improved, the flexibility obtained is too small to be of any practical value. The present invention provides a practical solution of this difficulty.

It has been proposed to provide the free inner ends of steering wheel spokes with rubber tips which can move freely in notches provided in the boss, such notches being lined or not with rubber. This arrangement, however, allows the spokes to move freely in a radial direction, which is a most undesirable feature, giving a feeling of looseness to the wheel and being detrimental to the steering quality of the wheel.

According to the invention, a steering wheel has a plurality of independent arms or spokes the inner ends of which are free or unconnected to one another and are resiliently isolated from the wheel boss by being floatingly enclosed in separate rubber or like parts which are supported by the boss and are enclosed and confined laterally within housings or recesses in said boss, the said arms or spokes also extending into the housings or recesses and the said rubber or like parts being firmly secured both to the arms or spokes and to the boss. The rubber or like parts are maintained in a state of compression in the housings or recesses and are preferably secured to the boss by being firmly clamped within the housings or recesses in the said boss; and they may be secured to the arms or spokes by being vulcanized or bonded to them or to metal parts firmly secured to or engaged with said arms or spokes.

The housings or recesses in the boss may be formed partly in a horizontal face of the body of the boss and partly in a clamping ring secured to the boss body by bolts or the like.

In order to assist in preventing lateral spreading of the rubber the top and bottom faces of the housings or recesses in the boss may be formed with grooves or corrugations corresponding to separate wires, corrugations or projecting parts of the arms or spokes.

In a practical embodiment of the invention the rubber or like parts are vulcanized or bonded to split or divided metal sleeves or thimbles which receive the inner ends of the arms or spokes and are securely clamped thereto by clamping pressure applied to the said rubber or like parts. The said metal sleeves or thimbles are conveniently of corrugated form to correspond with wires or corrugations of the arms or spokes.

The arms or spokes may be of a flexible spring construction or they may be rigid.

Figure 1 of the accompanying drawings is a plan of a flexible steering wheel in accordance with the present invention, the top clamping ring being shown broken away at opposite sides to expose the rubber parts.

Figure 3 is a horizontal section through one of the rubber parts at one side of the boss, corresponding to the line 3—3, Figure 2, the metal sleeve or thimble within the rubber part being shown in plan.

Figure 4 is a cross-section through the boss and one of the rubber parts, corresponding to line 4—4, Figure 3.

Figure 5 is a view showing one of the rubber parts and the boss body and clamping ring separated.

Figures 6, 6a and 6b show one of the rubber parts in end view, side view and plan.

Figures 7 and 7a show an end view and plan of the metal sleeve or thimble that is vulcanized within the rubber part.

Figure 8 is a vertical section showing a modified form of the invention as applied to a wheel having flat steel spokes.

Figure 9 is a horizontal section corresponding to line 9—9, Figure 8.

Figure 10 is a cross-section on line 10—10, Figure 9, upon a larger scale.

Figure 11 is a cross-section similar to Figure 10, but showing a modification as applied to a flat steel spoke.

Figure 12 shows how the rubber part may be covered with canvas.

Figure 13 represents a section on the line 13—13, Figure 12.

Figure 1:
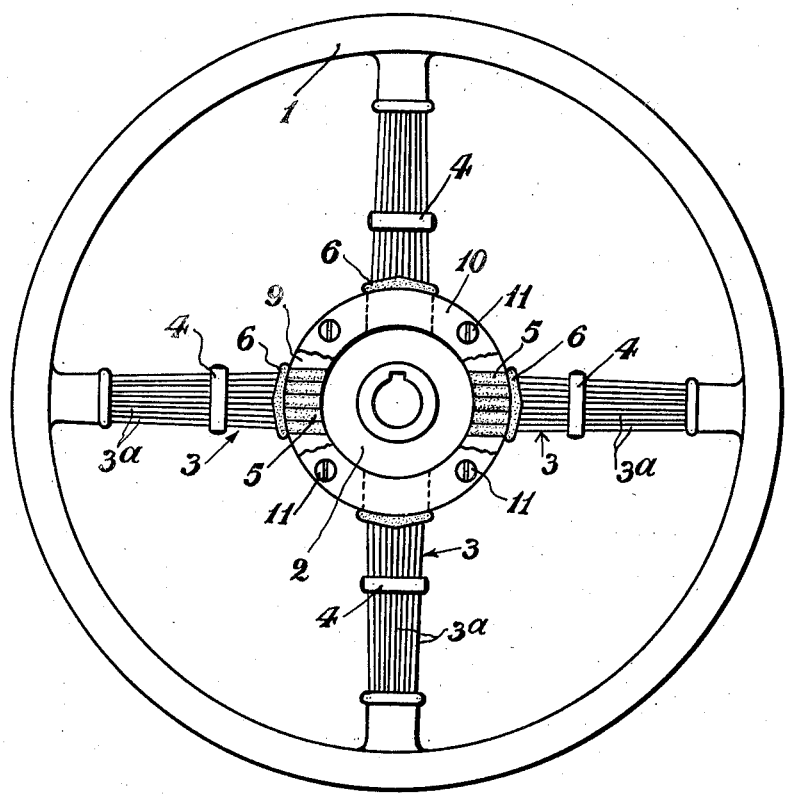
Figure 2:
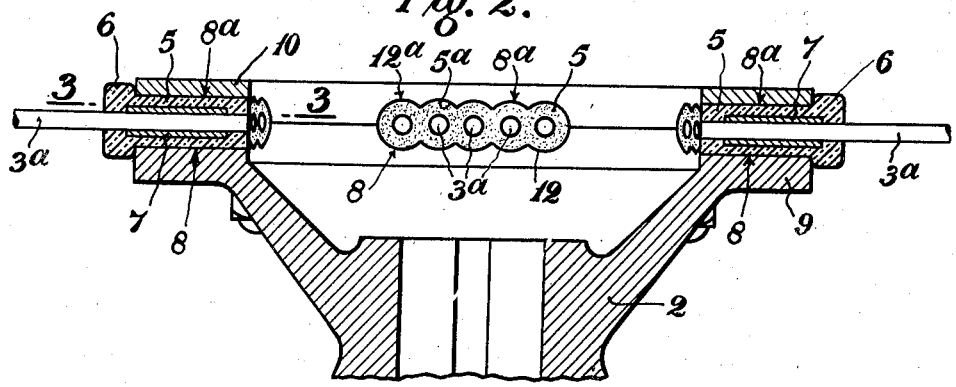
Figure 2 is a vertical section through the boss on a larger scale.

Referring to Figures 1 to 7 of the drawings, showing the preferred embodiment of this invention, the flexible steering wheel therein shown comprises a rim 1 connected to a central boss 2 by means of flexible arms or spokes 3 each composed of a plurality of spring steel wires 3a spaced apart and coupled together by transverse bars 4 provided with holes through which the wires are passed. The inner ends of the spokes are connected to the boss 2, according to the present invention, in a flexible and resilient manner through the medium of separate rubber bushes, cushions or socket members 5, in the form of loose moulded units. These bushes, cushions or socket members may be composed of soft rubber and are moulded to a flat elongated form, with a beading or thickened portion 6 at the outer end, and they are vulcanized or bonded on to an interior sheet-metal sleeve or thimble 7. This interior sleeve or thimble is split at 7a and is of corrugated form, as shown, so as to provide a series of spaced sockets within which the ends of the spoke wires 3a are inserted. The rubber members 5 are corrugated externally, at 5a, corresponding to the corrugated metal thimbles 7, and are fitted within enclosing housings, 8, 8a, in the side of the boss, each housing being formed by a recess 8 formed in the top face of a flange 9 on the body of the boss and a similar recess 8a formed in the under face of a top clamping ring 10 applied to the said boss flange 9 and adapted to be bolted to the boss by means of bolts 11 passed through the said parts 9, 10. The housings 8, 8a, correspond in size and shape to the contour of the rubber members 5, the bottom face of the lower recess 8 and the top face of the upper recess 8a being grooved or corrugated at 12, 12a, to fit or mate with the corrugations of the rubber.

Initially the depth of the rubber members 5, in their free state, is such that when they are positioned in the lower recesses 8 and the clamping ring 10 is applied, the said ring is considerably spaced from the boss flange 9, but when the bolts 11 are tightened up the ring 10 is drawn down on to or close to the flange 9 and the rubber members are compressed. As, however, the rubber cannot spread laterally owing to its being confined in the recesses, the clamping pressure is transmitted through the rubber to the split thimbles 7 which are thereby contracted or compressed so as to give a firm metal-to-metal grip upon the spoke wires and thereby prevent the spokes from being withdrawn. At the same time the rubber members 5 are securely clamped within the housings 8, 8a, and cannot be withdrawn. The grooving of these recesses at 12, 12a, assists to prevent lateral spreading or displacement of the rubber, as the different sections in the width thereof are definitely located within the opposed grooves, and thus an equalized or uniformly distributed pressure is transmitted to the thimbles 7 and to the spoke wires 3a, insuring a uniform and effective grip upon the latter.

The end beadings 6 of the rubber members 5 are located outside the boss and serve to position the said members within the housings during assembly and also prevent any inward movement or creeping of the rubber parts within their housings.

As soft rubber can be employed without impairing the grip obtained upon the spokes, a considerable degree of vertical flexibility can be obtained at the boss, thus adding to the flexibility of the spoke wires 3a and increasing the flexibility of the wheel as a whole. The degree of softness of the rubber may be varied as desired, but even when very soft rubber is used the grip on the spokes is perfect and they cannot be withdrawn by any ordinary or reasonable means, and the degree of flexibility of the wheel is equal to that which could only previously be obtained, with spring wire spokes, when employing a much smaller boss with longer spokes. At the same time undue freedom of the wheel rim is avoided owing to the compression of the rubber, and, after a certain initial movement of the spokes in relation to the boss, the rubber, being completely enclosed between the flange of the boss and the top ring, becomes further compressed by the spokes, and the free movement of the latter is progressively resisted. In the event of an accident, however, complete deflection of the wheel is possible.

Figures 8 to 10 of the drawings show one method of applying the invention to a steering wheel having flexible steel-strip spokes. The inner end of each of these spring spokes 3 is longitudinally fluted at 3b and the rubber member or cushion 5 is moulded directly on to the said fluted end and is vulcanized or bonded thereto, without the use of a metal insertion. The said rubber member 5 is externally corrugated at 5a to correspond to the flutings 3b, and is enclosed in a housing formed by recesses 8, 8a, respectively in the boss flange 9 and the top ring 10, these recesses being grooved or corrugated to correspond to the contour of the rubber members. The flange 9 and ring 10 are bolted together at 11 so as to clamp the rubber members firmly within their housings.

If desired, however, as shown in Figure 11, the rubber member 5 may be vulcanized or bonded on to a split metal sleeve or thimble 7 which is corrugated or fluted to fit the flutings 3ᵇ of the flat steel spoke 3, so that when the ring 10 is bolted up tight to the boss flange 9 the rubber will be securely clamped within its housing 8, 8ᵃ, and the sleeve 7 will be contracted so as to grip the spoke.

In a modification, the end of the flat spoke may be perforated and the thimble 7 may have projections that are caused to engage the perforations.

The invention could also be applied to a steering wheel having rigid arms or spokes, so as to give a certain amount of flexibility to the wheel. The rubber members could, in this case, be vulcanized or bonded directly on to the ends of the rigid spokes, which may be grooved or provided with keying projections, or the rubber could be vulcanized or bonded to a metal sleeve or thimble which is caused to grip the rigid spoke by the clamping of the rubber within the housing, as hereinbefore described in connection with the application of the invention to flexible spokes.

In the case of wheels with wire spokes, as in Figures 1 to 7, the rubber members could be vulcanized directly on to the wires, without using a metal gripping sleeve, in the same way as they may be vulcanized to flat strip spokes or rigid arms as above described.

In any of the arrangements the rubber members 5 may be covered, or partly covered, exteriorly with thin canvas 13, as shown, for example, in Figures 12 and 13. This enables the grooved parts of the steering wheel flange and clamping ring to obtain a better grip on the rubber and prevents any tendency for the rubber to bulge or to be pressed out from the boss of the steering wheel during assembly, as might happen if very soft rubber is used. In moulding the rubber part, the canvas 13 and metal thimble 7 may be placed in the mould first, and the rubber is bonded to or moulded around both the thimble and the canvas, being intimately united to the latter.

Having fully described my invention, what I desire to claim and secure by Letters Patent is:

1. A steering wheel comprising a rim portion, a central boss having a plurality of open ended recesses in a horizontal face, separate rubber or like parts seated and confined laterally within said recesses, a clamping ring having recesses corresponding and opposed to the recesses in the boss to form therewith housings enclosing the rubber or like parts, a plurality of independent spokes having their inner ends extending into the housings and floatingly enclosed in the respective rubber or like parts, and means for pressing the clamping ring towards the boss in order to compress the rubber or like parts which are firmly secured to the spokes and boss.

2. A steering wheel comprising a rim portion, a central boss having in its side a plurality of grooved recesses, separate rubber or like cushions seated and confined laterally within said recesses, a clamping member having grooved recesses corresponding to the recesses in the boss to form therewith housings enclosing the cushions, a plurality of independent spokes having their inner ends extending into the housings and floatingly enclosed in the respective cushions, and means for pressing the clamping member towards the boss in order to compress the cushions and firmly secure them to the boss.

3. A steering wheel comprising a rim portion, a central boss having in its side a plurality of recesses, separate moulded rubber cushions fitted in the recesses and confined laterally therein, means for clamping and compressing the cushions within the recesses, and a plurality of independent spokes having their inner ends extending into the housings and floatingly enclosed within the respective cushions, being firmly secured to said cushions.

4. A steering wheel comprising a rim portion, a central boss having in its side a plurality of grooved recesses, separate moulded rubber cushions fitted in the recesses said cushions having corrugated tops and bottom faces, a clamping member having grooved recesses corresponding to the recesses in the boss and forming therewith housings enclosing the cushions, a plurality of independent spokes having their inner ends floatingly enclosed within and firmly secured to the respective cushions, and means for pressing the clamping member towards the boss to clamp and compress the cushions within the housings.

5. A steering wheel comprising a rim portion, a central boss having in its side a plurality of recesses or housings, a plurality of rubber or like cushions seated in the recesses or housings, metal socket parts embedded within and bonded to the cushions, a plurality of independent spokes having their inner ends engaged within the metal socket parts, and means for compressing the cushions to secure them firmly within the recesses or housings and to cause the socket parts to firmly grip the spokes.

6. A steering wheel comprising a rim portion, a central boss having in its side a plurality of recesses or housings, a plurality of separate rubber or like cushions seated in the recesses or housings, split thimbles embedded within and bonded to the cushions, a plurality of independent spokes having their inner ends engaged and supported within the thimbles of the respective cushions, and clamping means for compressing and clamping the cushions within the recesses or housings and for causing the thimbles to grip the spokes.

7. A steering wheel comprising a rim portion, a central boss having in its side a plurality of recesses or housings, a plurality of independent spokes, rubber or like cushions vulcanized upon the inner ends of the spokes and seated in the recesses or housings, and means for compressing said cushions within the recesses or housings to secure them firmly to the boss.

8. A steering wheel comprising a rim portion, a central boss having in its side a plurality of recesses, separate rubber cushions fitted in the recesses and confined laterally therein, canvas coverings applied to and united with the outer faces of the rubber cushions, means for clamping and compressing the cushions within the recesses, and a plurality of independent spokes having their inner ends extending into the recesses and floatingly enclosed within and secured to the respective cushions.

9. A steering wheel comprising a rim portion, a central boss having a plurality of separate open recesses in its side, separate rubber or like cushions enclosed and confined laterally within said recesses, a plurality of separate spokes having free inner ends independently mounted and supported in the respective rubber cushions so as to be resiliently isolated from the boss and from one another, said spokes extending into the recesses, and clamping means whereby the rubber cushions are maintained in a state of compression, the said cushions being firmly secured both to the spokes and to the boss.

10. In a steering wheel, the combination of a boss, rubber socket members supported by said boss, a metallic sleeve in each of said socket members, a spoke in each metallic sleeve and projecting beyond the ends of said sleeve, and means carried by said boss and exerting clamping pressure on said socket members and metallic sleeves.

11. In a steering wheel, the combination of a boss, rubber socket members supported by said boss, a metallic sleeve entirely within and surrounded by each socket member, a spoke extending into each metallic sleeve, and means carried by said boss and exerting pressure on said socket members, whereby the spokes, metallic sleeves, and socket members are retained in a fixed position.

12. In a steering wheel, the combination of a boss, a plurality of separate rubber socket members supported by said boss, a plurality of spokes having free ends extending into the respective socket members, and means on said boss and socket members compressing said socket members in a corrugated or wavy configuration.

13. In a steering wheel, the combination of a boss, provided with a clamping unit, said boss and clamping unit provided with a plurality of separate sockets having uneven walls, a plurality of separate rubber socket members in said sockets of the boss and clamping unit and conforming exteriorly to the shape of said walls, and a plurality of spokes having free ends extending into said rubber socket members, the clamping unit clamping the socket members within the sockets.

14. In a steering wheel, the combination of a boss, split metallic sleeves carried by said boss, each metallic sleeve provided exteriorly with a yieldable covering, spokes extending into said metallic sleeves and directly engaged thereby, and means on said boss for clamping said yieldable coverings of said metallic sleeves, whereby they are compressed for frictionally gripping said spokes.

FRANCIS CYRIL ASHBY.